United States Patent
Coker et al.

(10) Patent No.: US 6,968,423 B2
(45) Date of Patent: Nov. 22, 2005

(54) DYNAMIC DATA ACCESS PATTERN DETECTION IN A BLOCK DATA STORAGE DEVICE

(75) Inventors: Kenny T. Coker, Mustang, OK (US); Edwin S. Olds, Norman, OK (US); Jack A. Mobley, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 388 days.

(21) Appl. No.: 10/080,813

(22) Filed: Feb. 22, 2002

(65) Prior Publication Data

US 2003/0149837 A1    Aug. 7, 2003

Related U.S. Application Data

(60) Provisional application No. 60/355,675, filed on Feb. 5, 2002.

(51) Int. Cl.[7] ............................................. G06F 12/00
(52) U.S. Cl. ...................................... 711/113; 711/137
(58) Field of Search ................................. 711/113, 137

(56) References Cited

U.S. PATENT DOCUMENTS

| | | | |
|---|---|---|---|
| 5,146,578 A * | 9/1992 | Zangenehpour | ............. 711/137 |
| 5,313,626 A | 5/1994 | Jones et al. | |
| 5,530,829 A | 6/1996 | Beardsley et al. | |
| 5,570,332 A | 10/1996 | Heath et al. | |
| 5,584,007 A | 12/1996 | Ballard | |
| 5,636,355 A | 6/1997 | Ramakrishnan et al. | |
| 5,664,145 A | 9/1997 | Apperley et al. | |
| 5,682,500 A * | 10/1997 | Vishlitzky et al. | .......... 711/113 |
| 5,727,183 A | 3/1998 | Takahashi | |
| 5,829,018 A | 10/1998 | Moertl et al. | |
| 5,875,455 A | 2/1999 | Ito | |
| 5,983,319 A | 11/1999 | Ito | |
| 6,164,840 A | 12/2000 | Lynch | |
| 6,189,080 B1 | 2/2001 | Ofer | |
| 6,263,408 B1 | 7/2001 | Anderson et al. | |
| 6,339,811 B1 * | 1/2002 | Gaertner et al. | ............ 711/112 |
| 6,654,850 B2 * | 11/2003 | Fox et al. | ................... 711/111 |
| 2003/0018849 A1 * | 1/2003 | Takaichi | ..................... 711/113 |

* cited by examiner

*Primary Examiner*—Reginald G. Bragdon
(74) *Attorney, Agent, or Firm*—Fellers, Snider, et al.

(57) ABSTRACT

Method and apparatus for transferring data between a host device and a data storage device having a first memory space (such as a buffer) and a second memory space (such as magnetic discs). Data are stored on the discs in host-addressable data sectors. The data storage device is configured to operate in a local mode of operation and a nonlocal mode of operation. During the local mode, nonrequested user data are retrieved from the discs and placed into the buffer in anticipation of a future request for the nonrequested user data. During nonlocal mode, such nonrequested user data are not retrieved. An interface circuit monitors host data access patterns and dynamically switches between the nonlocal and local modes in relation to proximity of a data sector address of each most recently received read command to data sector addresses associated with previously received read commands.

18 Claims, 6 Drawing Sheets

DYNAMIC DATA ACCESS PATTERN DETECTION IN A BLOCK DATA STORAGE DEVICE

RELATED APPLICATIONS

This application claims priority to U.S. Provisional Application No. 60/355,675 entitled Method for Improving Disc Drive Performance Through Identification of Access Patterns filed Feb. 5, 2002.

FIELD OF THE INVENTION

The claimed invention relates generally to the field of digital data storage systems, and more particularly but not by way of limitation, to an apparatus and method for optimizing the transfer of data between a host device and a data storage device through dynamic detection of access patterns in the blocks of data requested by the host device.

BACKGROUND

Block data storage devices store and/or retrieve digital data in the form of blocks, which are individually addressable by a host device. Exemplary block data storage devices include hard disc drives, optical disc recorders and players, and magnetic digital tape recorders and players.

Such devices typically comprise a hardware/firmware based interface circuit having a buffer (first memory space), a communication channel and a recordable medium (second memory space). The second memory space is divided into a number of addressable blocks which are assigned host-level addresses (sometimes referred to as logical block addresses or LBAs). Each LBA typically has a corresponding physical block address (PBA) used by servo control circuitry to align a data transducing head with the appropriate portion of the medium to access the desired LBA.

To write data to the medium, the host device issues a write command comprising the user data to be stored by the storage device along with a list of LBAs to which the user data are to be stored. The storage device temporarily stores the user data in the first memory location, schedules movement of the data transducing head to the appropriate location(s) over the medium, and then uses write channel portions of the communication channel to apply the appropriate encoding and conditioning of the data to write the data to the selected LBAs.

To subsequently read the data from the storage device, the host device issues a read command identifying the LBAs from which data are to be retrieved. The storage device schedules movement of the data transducing head to the appropriate location(s) over the medium, and then uses read channel portions of the communication channel to decode readback data which are placed into the first memory space (buffer) for subsequent transfer back to the host device.

A typical data storage device is configured to concurrently handle multiple pending access (read and write) commands from the host device. The commands are arranged into a command queue and a sort strategy is used to identify a sequence of execution of the pending access commands that will tend to optimize the rate at which data are transferred between the host device and the data storage device. A typical sort strategy involves calculating the elapsed time that would be required to move the appropriate data transducing head to the appropriate physical address of the medium in order to service each command. Generally, the access command that can be serviced in the shortest access time is selected from among the command queue as the next command to be executed.

In data storage devices that use rotatable media (discs), the time required for a particular data block to rotate around and reach the head (latency) is an important factor when selecting the execution order, as delays in waiting for the disc to rotate a selected data block around to the data transducing head can significantly decrease the resulting transfer rate.

One way that storage devices attempt to reduce the effects of such latency delays involves reading additional, nonrequested data into the buffer while the device waits for the requested data block to reach the head. If the host subsequently requests such data in the future, the data request can be satisfied immediately from the buffer (sometimes referred to as a "cache hit"). Cache hits tend to significantly improve data transfer performance and are therefore highly desirable.

Well known approaches to placing nonrequested data into the buffer include read look ahead (RLA) and read on arrival (ROA) techniques. Generally, RLA involves receiving a command to move a selected head to a new track, but remaining on the existing track to read additional data sectors before moving to the new track. By contrast, ROA generally involves proceeding to a new track and immediately reading data sectors on the new track during the latency period until the target sector rotates around and reaches the head.

Host data access patterns play a large role in determining the effectiveness of placing nonrequested data into the buffer. When the host device is requesting data that are localized and/or sequential, then techniques such as RLA and ROA can increase the probability that future requests may be satisfied by cache hits. On the other hand, if the host data accesses are to nonlocalized positions within the LBA sequence (i.e., apparently random with respect to the disc surfaces), then there is little (if any) benefit to be gained by caching nonrequested data. Moreover, the overhead typically required in prior art systems to cache the data can, in some cases, actually degrade data transfer performance slightly since the drive is occupied with putting nonrequested data into the buffer and managing these data instead of focusing exclusively on servicing actual access commands from the host.

In the prior art, it is reasonably straightforward to determine that a device should switch from a local mode of operation to a nonlocal mode of operation (that is, that the device should stop caching nonrequested data). All that generally needs be done is monitor the frequency of cache hits over a period of time. If such hits seldom (or never) occur, then there is no need to cache the nonrequested readback data and such operation can be halted.

The more difficult task, however, is to determine when it would be appropriate to switch from a nonlocal mode to a local mode of operation (that is, start caching data after a period of time during which data were not cached). It is difficult to assess the benefits that might have been gained by caching data when the device has been operating in a nonlocal mode. To date there is no known existing mechanism for reliably switching from a nonlocal mode to a local mode of operation based upon a detected change in data access patterns.

Accordingly, there is a need for improvements in the art to provide effective data transfer control of a block data storage device that overcomes these and other limitations of the prior art.

SUMMARY OF THE INVENTION

In accordance with preferred embodiments, a block data storage device is provided with a buffer (first memory space) and a recordable medium comprising a number of rotatable discs (second memory space).

User data are stored on the discs in a number of data sectors having data sector addresses. A moveable data transducing head is provided to access the data sectors. An interface circuit processes read commands from a host device to retrieve requested user data from selected data sectors.

The interface circuit is preferably configured to operate in two modes of operation, a non-local mode and a local mode (also referred to herein as first and second modes, respectively). During the local (second) mode of operation, nonrequested user data from the recording medium are retrieved and placed into the buffer in anticipation of a future request for the nonrequested user data. During the local (first) mode of operation, nonrequested user data are not retrieved from the discs and are not placed into the buffer.

The interface circuit is configured to monitor data access patterns from the host device. The interface circuit dynamically switches from a nonlocal mode of operation to a local mode of operation in relation to proximity of a data sector address of a most recently received read command to data sector addresses associated with previously received read commands.

This is preferably carried out by generation of a read command history table comprising a range of data sector addresses associated with each of a plurality of n recently received read commands. The interface circuit switches from the nonlocal mode to the local mode of operation when a data sector address associated with the most recently received read command falls within at least a selected one of the ranges of data sector addresses of the read command history table.

The interface circuit is further preferably configured to dynamically switch from the local mode to the nonlocal mode of operation in relation to the proximity of the data sector address of the most recently received read command to the data sector addresses of previously received read commands. Preferably, this is carried out by accumulating a number of m missed counts (noncache hits) using the history table.

Preferably, the recordable medium comprises a recording disc on which a plurality of concentric tracks are defined, and the interface circuit employs a read look ahead (RLA) technique during the local mode. During a latency period between execution of consecutive first and second read commands, the interface circuit causes the data transducing head to remain on a first track having a data sector associated with the first read command so that the nonrequested data are retrieved from at least one other data sector on the first track.

Alternatively, the interface circuit preferably employs a read on arrival (ROA) technique so that, during a latency period between execution of consecutive first and second read commands, the interface circuit causes the data transducing head to move to a second track having a data sector associated with the second read command so that the nonrequested data are retrieved from at least one other data sector on the second track.

These and various other features and advantages that characterize the claimed invention will be apparent upon reading the following detailed description and upon review of the associated drawings.

BRIEF DESCRIPTION OF THE DRAWINGS

FIG. 3 is a functional block diagram of the disc drive.

FIG. 6 generally illustrates a read command history table employed by the disc drive.

DETAILED DESCRIPTION

Figure 1:
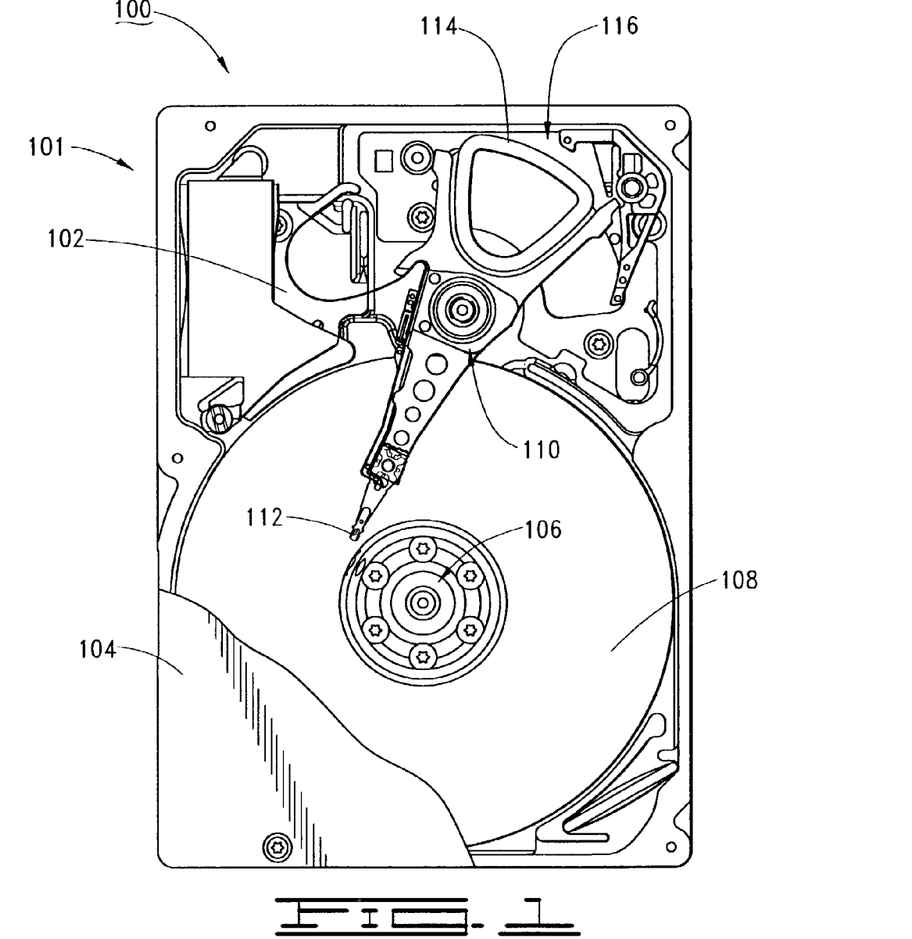
FIG. 1 is a plan view of a disc drive block data storage device constructed and operated in accordance with preferred embodiments of the present invention.

Referring now to the drawings, FIG. 1 provides a top plan view of a disc drive block data storage device 100. The disc drive 100 includes a sealed housing 101 formed by a rigid base deck 102 and a top cover 104 (shown in partial cutaway).

Mechanical components of the disc drive 100 are supported within the housing 101, including a spindle motor 106 which rotates a number of recording discs 108 at a constant high speed, and an actuator assembly 110 supports a corresponding number of data transducing heads 112 adjacent the discs 108. The actuator assembly is rotated about an actuator axis through application of current to a coil 114 of a voice coil motor (VCM) 116.

Figure 2:
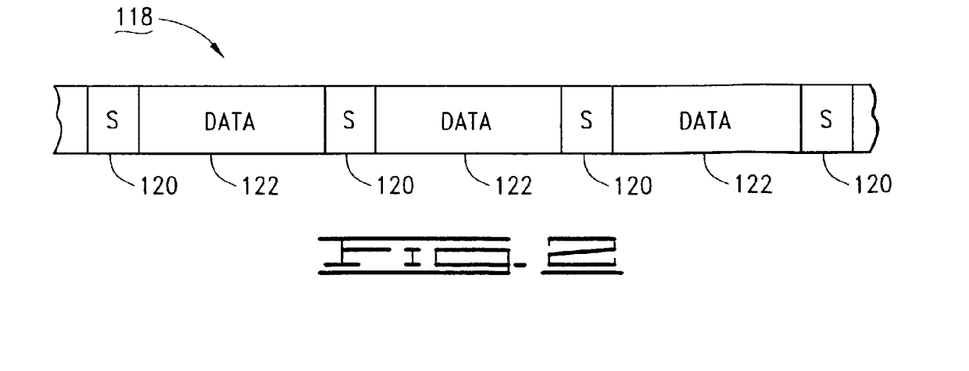
FIG. 2 shows a portion of a track to illustrate the manner in which data are arranged on each of the disc recording surfaces of the disc drive of FIG. 1.

Data are stored on a number of concentric tracks defined on the discs 108. FIG. 2 shows a portion of a track 118 from a selected disc surface. The track 118 includes a plurality of angularly arranged servo data fields 120. The servo data fields 120 provide position information used by servo control circuitry of the disc drive 100 to control the position of the heads 112.

User data from a host device are stored in data sectors defined in data areas 122 between adjacent pairs of the servo data fields 120. Each data sector stores a fixed amount of user data (such as 512 bytes) and is separately addressable by the host using a logical block address (LBA). The respective numbers of servo data fields 120 and data sectors per track can vary, but typical numbers for disc drives of the present generation are around 150–250 servo data fields and around 300–1000 data sectors per track. A typical disc drive can thus have several million consecutively numbered LBAs, depending upon the data capacity and format of the drive.

FIG. 3 provides a functional block diagram for the disc drive 100. A hardware/firmware based interface circuit 124 communicates with a host device (such as a personal computer, not shown) and directs overall disc drive operation.

The interface circuit 124 includes a programmable controller (processor) 126 with associated memory 128, a buffer 130, an error correction code (ECC) block 132, a sequencer 134 and an input/output (I/O) control block 136.

The buffer 130 (also referred to herein as a "first memory space") temporarily stores user data during read and write operations, and includes a command queue (CQ) 131 where multiple pending access operations are temporarily stored pending execution. The ECC block 132 applies on-the-fly error detection and correction to retrieved data. The sequencer 134 asserts read and write gates to direct the reading and writing of data. The I/O block 136 serves as an interface with the host device.

FIG. 3 further shows the disc drive 100 to include a read/write (R/W) channel 138 which encodes and serializes data during write operations and reconstructs user data from the discs 108 during read operations (the discs are also referred to herein as a "second memory space"). A preamplifier/driver circuit (preamp) 140 applies write currents to the heads 112 and provides preamplification of readback signals.

A servo control circuit 142 uses the servo data from the servo data fields 120 (FIG. 2) to provide the appropriate current to the coil 114 to position the heads 112 as required. The servo control circuit 142 preferably comprises a programmable ARM processor 144 (Advanced Reduced-Instruction-Set-Computer (RISC) Machine). The controller 126 communicates with the ARM 144 to move the heads 112 to the desired locations on the discs 108 during execution of the various pending access commands in the command queue 131 in turn.

As discussed in greater detail below, the interface circuitry 124 advantageously operates to optimize data transfer performance by dynamically switching from a nonlocal (first) mode of operation to a local (second) mode of operation in relation to a detected access pattern in read commands issued by the host device. During a local mode of operation, nonrequested user data are retrieved from the discs 108 and placed into the buffer 130 in anticipation of a future request for the nonrequested user data. During a nonlocal mode of operation, such nonrequested user data are not retrieved from the recording medium and are not placed into the buffer.

Figure 4:
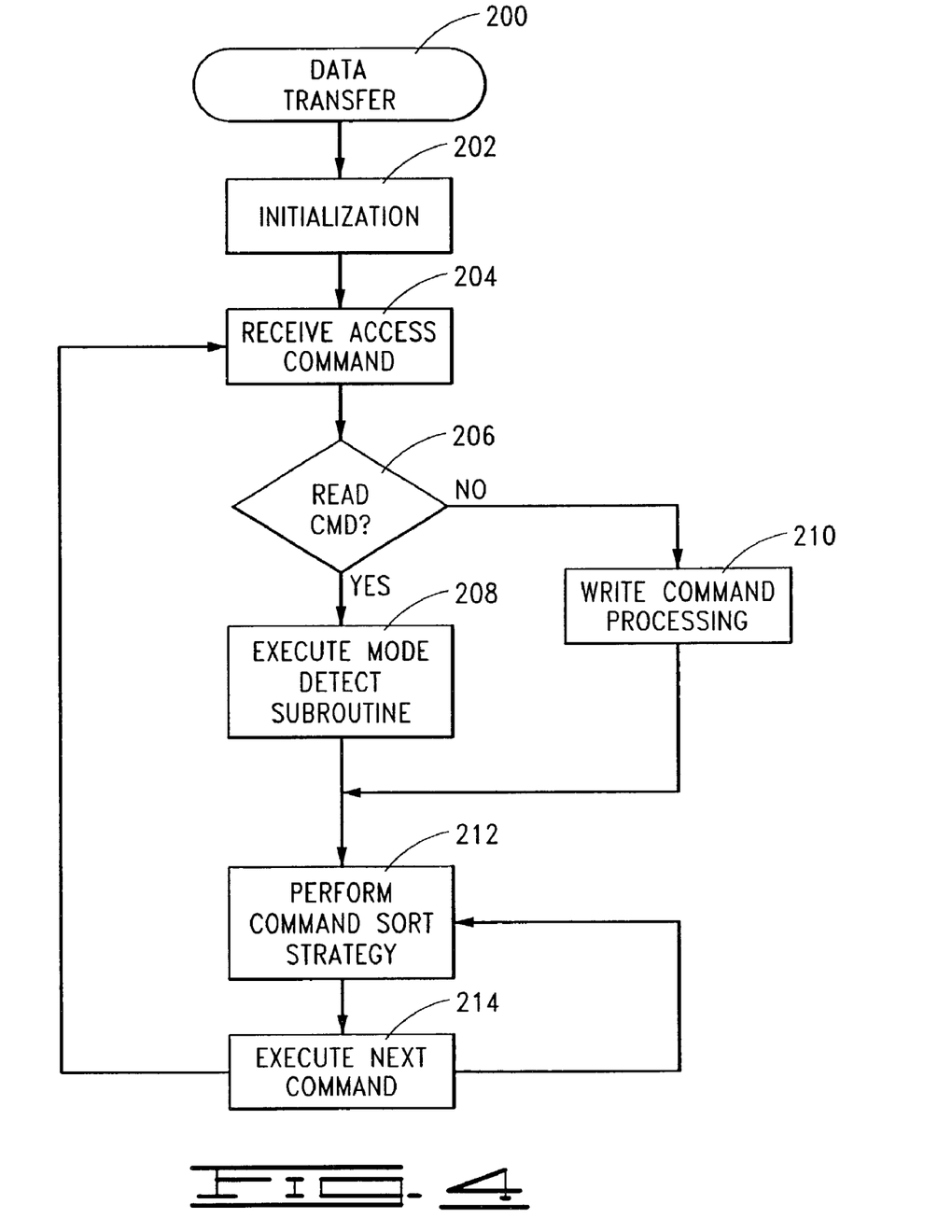
FIG. 4 is a flow chart for a DATA TRANSFER routine, generally illustrative of steps carried out by the disc drive in accordance with preferred embodiments of the present invention to transfer data between the disc drive and a host device.

FIG. 4 provides a flow chart for a DATA TRANSFER routine 200, illustrative of steps carried out by the interface circuit 124 in accordance with preferred embodiments of the present invention. An initialization step takes place at 202 during which the disc drive 100 is configured for use and various parameters are initially selected. Thereafter, the disc drive 100 proceeds with normal operation during which access commands are issued by the host device and received by the interface circuit 124, as indicated at step 204.

As will be recognized, during operation the host device issues access commands from time to time at a rate and in an order as determined by the needs of the host. Thus, there can be times when access commands are issued relatively infrequently and other times when a large number of access commands are issued in rapid succession. Each read access command identifies the LBAs on the discs 108 the contents of which the host requires the disc drive 100 to retrieve. Each write access command includes the write data that the host requires the disc drive 1100 to store and identifies the specific LBAs in which the disc drive is to store the write data. The interface circuit 124 creates a command node as a sortable access instruction in the command queue 131 for each new command.

Decision step 206 next determines whether the new access command is a read command. If so, the routine executes a MODE DETECT subroutine 208 as discussed below. On the other hand, if the most recently received access command is a write command, the flow passes to step 210 where the drive performs write command processing, as desired. For example, if write caching is employed the interface circuit 124 will report a command complete status to the host device, temporarily store the write data in the buffer 130, and schedule the writing of the data in the near future. If write caching is not employed, then the interface circuit 124 will give priority to the write command and schedule the writing of the data before continuing with other steps in the flow.

Continuing with the routine of FIG. 4, the interface circuit 124 performs a command sort strategy at step 212 to identify the next appropriate command node to execute in the command queue 131, and proceeds to execute this command at step 214. It will be noted that the receipt of new access commands and the rate at which commands are executed are asynchronous; thus, FIG. 4 has been provided with return loops to show continued operation of the above steps until the disc drive 100 is turned off or enters an idle mode.

Figure 5:
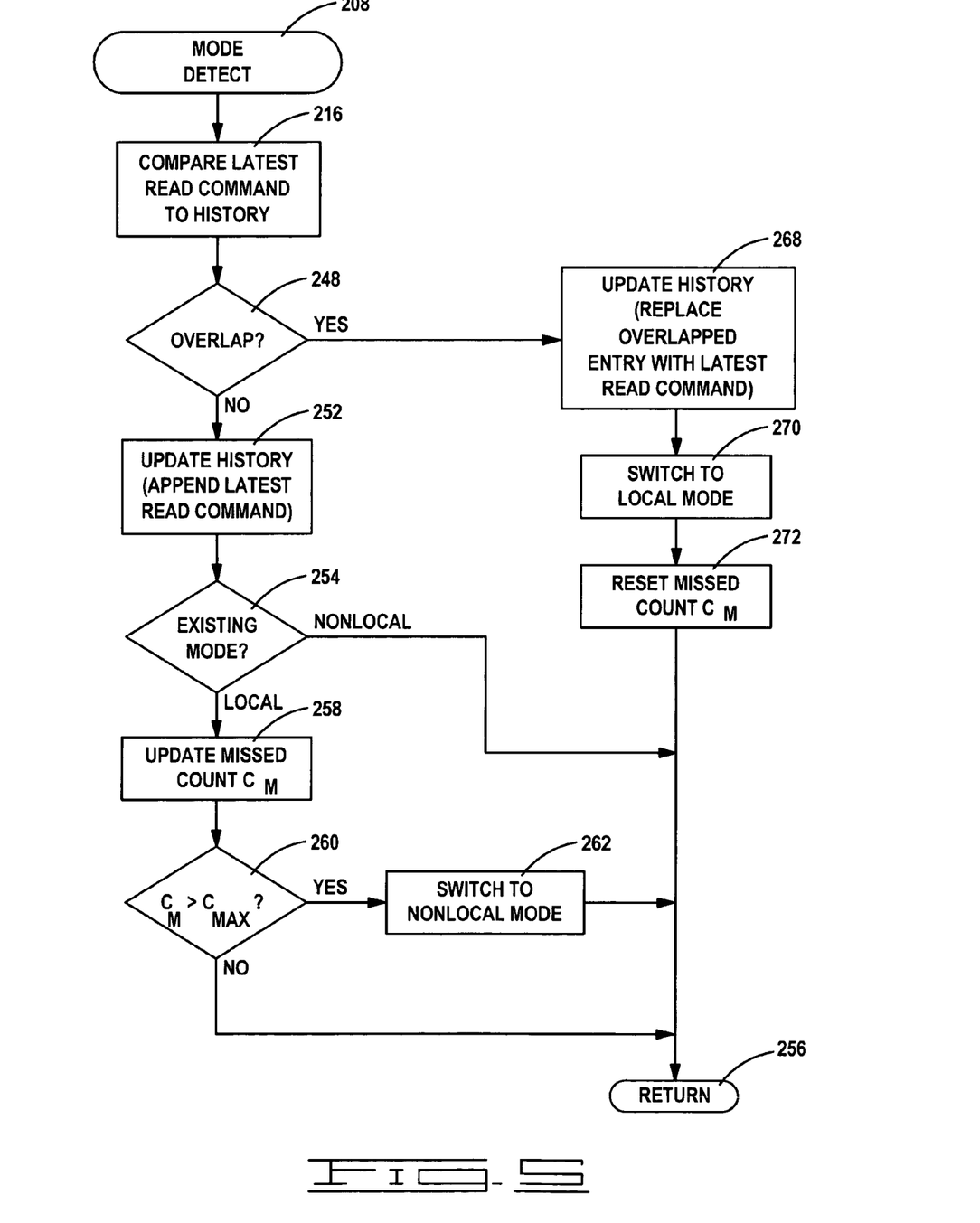
FIG. 5 is a flow chart for a MODE DETECT routine, which is executed as a subroutine of the DATA TRANSFER routine of FIG. 4.

The MODE DETECT subroutine of FIG. 5 generally operates to evaluate current data access patterns of the host device and dynamically configure the disc drive 100 accordingly to optimize data transfer performance. At step 216 the most recently received (latest) read command is compared to a history of recent read commands. This is preferably carried out using a read command history table as shown in FIG. 6.

The data in FIG. 6 generally represent a localized snapshot of recent host access patterns. The data are arranged along a vertical range (row axis 220) indicative of the most recent 16 read commands (not counting the most recently received read command under evaluation). While 16 read commands are shown, it will be understood that any selected plurality of n recent read commands can be employed as desired. A horizontal range (column axis 218) indicates data sector addresses (LBAs) on the discs 108.

Each of the 16 read commands in FIG. 6 is shown to have a range of associated data sector addresses (as indicated by block 222 for read command 1). Preferably, this range of associated data sector addresses comprises a range of unrequested LBAs that could have been retrieved by the disc drive either before or (preferably) at the conclusion of each of the read commands.

In a preferred embodiment, each range of address blocks comprises a number equal to the maximum number of LBAs that can be assigned to a segment of the buffer 130. To alleviate confusion, it will be understood that the data sector address blocks shown in FIG. 6 do not necessarily represent nonrequested data that actually resides (or resided) in the buffer 130; rather, the data sector address blocks represent what potentially could have been placed into the buffer had a local mode technique been employed. It will further be noted that the blocks in FIG. 6 preferably represent data sector address ranges that are sequential within each range, but the data sector range of each consecutive read command in the table is non-sequential with respect to the data sector range of the previous read command (i.e., horizontal gaps exist between adjacent pairs of the blocks, as shown in FIG. 6).

Figure 7:
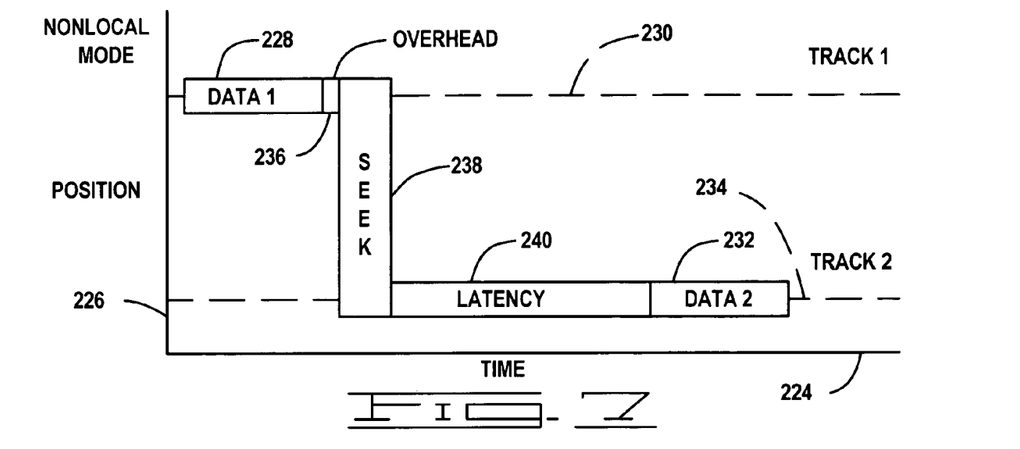
FIG. 7 is a timing diagram to generally illustrate operation of the disc drive in a nonlocal mode.
Figure 8:
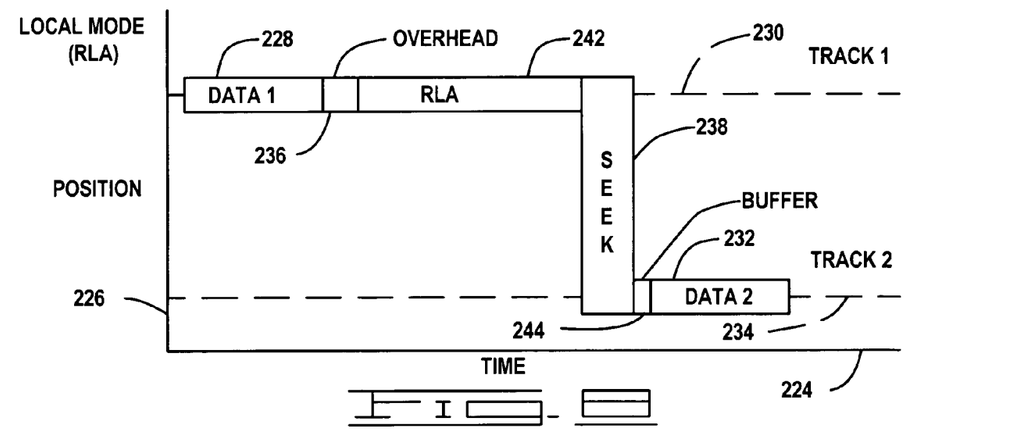
FIG. 8 is a timing diagram to generally illustrate operation of the disc drive in a local mode in which read look ahead (RLA) techniques are employed.
Figure 9:
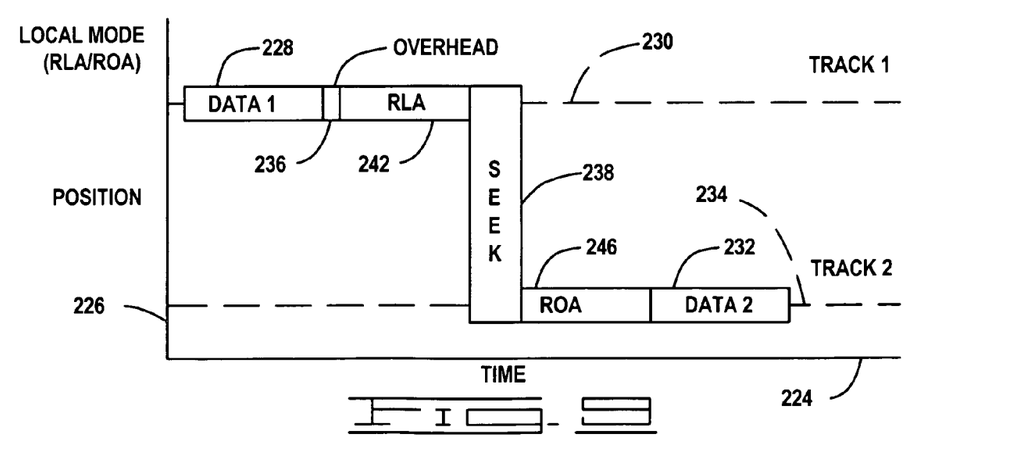
FIG. 9 is a timing diagram to generally illustrate operation of the disc drive in a local mode in which both read look ahead (RLA) and read on arrival (ROA) techniques are employed.
Figure 11:
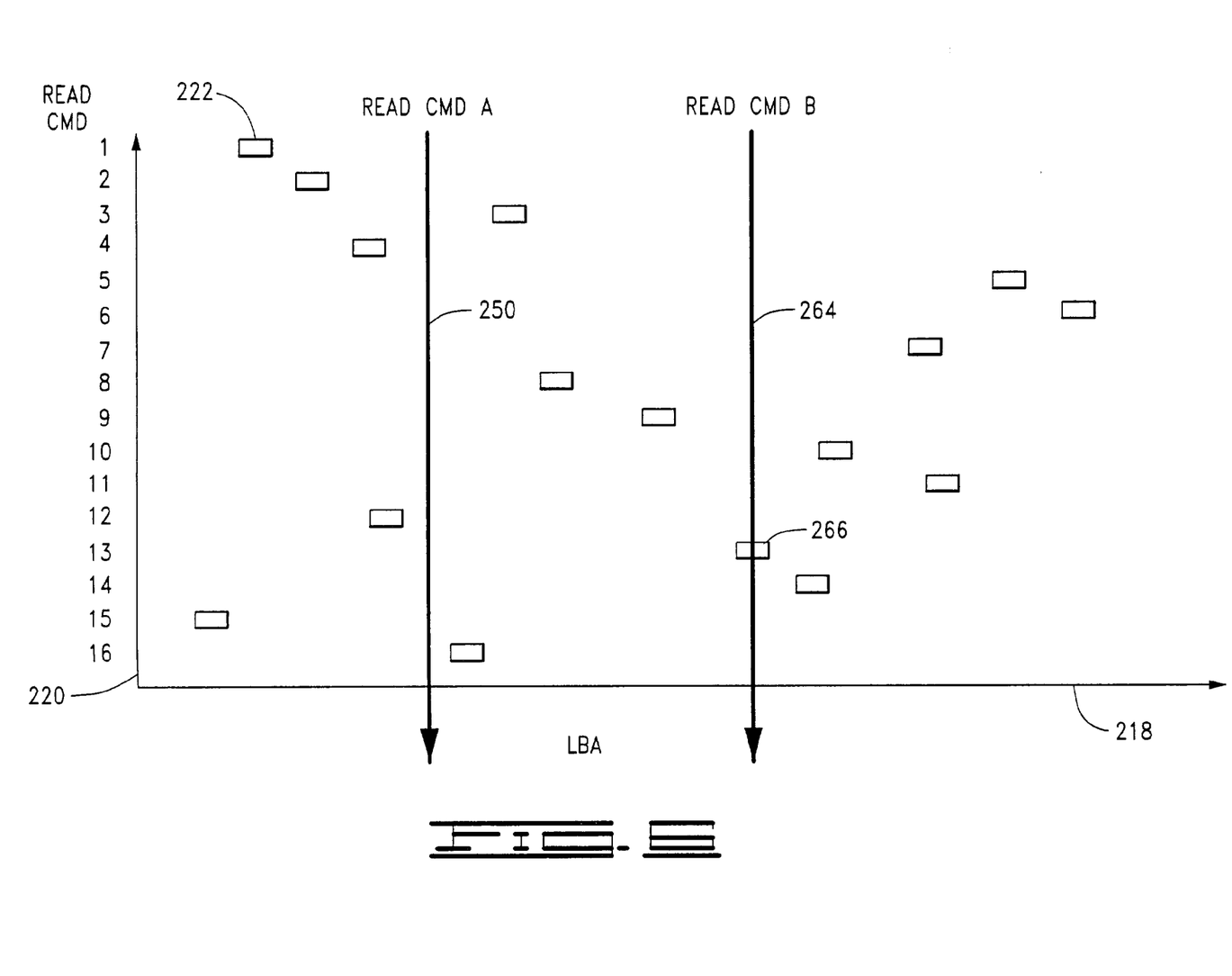

Before continuing with a discussion of the history table of FIG. 6, it may be helpful to compare and contrast local mode and nonlocal mode operation in greater detail, and FIGS. 7–9 have been provided to this end.

FIG. 7 is a timing diagram to illustrate nonlocal mode operation. Nonlocal mode is appropriate when the host device is requesting data in an apparently random fashion; that is, subsequent requests are for data sectors at nonconsecutive and nonlocal positions within the LBA addressing scheme. Thus, the probability of the disc drive 100 satisfying a future request for data from cached nonrequested data is very low, and the additional processing time required to place nonrequested data into the buffer 130 provides little or no benefit (and can actually reduce data transfer rates slightly). Thus, no nonrequested data are placed into the buffer 130 during the nonlocal mode operation of FIG. 7.

The diagram of FIG. 7 is plotted against a horizontal time axis 224 and a vertical position axis 226. First and second consecutive read commands are carried out to retrieve data from a first set of data sectors (DATA 1 block 228) on a first data track 230 and then from a second set of data sectors (DATA 2 block 232) on a second data track 234. Reading from left to right and understanding that the respective elapsed times are not necessarily represented to scale, the disc drive first transfers the DATA 1 requested data associated with the first executed read command (block 228).

After a short overhead processing time (block 236) during which the interface circuit 124 identifies the second read command as the next appropriate command to execute, the controller 126 instructs the servo control circuit 142 to execute a seek (block 238) to move a selected head 112 to the second track 234. It will be recognized that the seek may include a head switch operation to activate and use a different selected head 112.

Once the selected head 112 reaches the second track 234, the disc drive 100 incurs a latency delay (represented by latency block 240) during which time the drive waits for the data sectors associated with the DATA 2 block 232 to reach the selected head 112. The drive 100 then reads the DATA 2 block 232 and transfers this requested data to the buffer 130 for subsequent transfer to the host device.

By contrast, FIG. 8 provides a timing diagram for a selected local mode of operation of the disc drive 100. FIG. 8 employs a read look ahead (RLA) technique. After the requested user data in the DATA 1 block 228 are transferred to the buffer 130 and the interface circuit 124 performs the requisite processing of the overhead block 236, the controller 126 instructs the selected head 112 to remain on the first track 230 and continue to read nonrequested data from data sectors on the first track 230 (as indicated by RLA block 242). These nonrequested data are placed into the buffer 130 pending a possible future request by the host device.

The interface circuit 124 next instructs the servo control circuit 142 to execute the seek (block 238) to move the selected head 112 to the second track 234 and, after a short buffering time (block 244), transfers the requested DATA 2 data (block 232) to the buffer 130.

The time during which RLA data are obtained is preferably determined in relation to the available elapsed time (phase) between the end of the first command and the beginning of the second command. Thus, for example, if there is a 4 millisecond (4 ms) calculated phase between the first and second commands, and the seek will take 2 ms to perform, then RLA data can be accumulated for a little less than 2 ms. Since discs rotating at about 10,000 revolutions per minute require about 6 ms per rotation, then up to about a third of a track of nonrequested readback data can be obtained from the first track 230 in this example.

Use of the RLA local mode of FIG. 8 is advantageous when the host device is requesting data in an increasing sequence. Other local modes are readily contemplated, however. For example, FIG. 9 shows a local mode that uses both read look ahead (RLA) and read on arrival (ROA) techniques.

As before, the interface circuit 124 executes the first read command to recover the requested data from the DATA 1 block 228, performs the necessary overhead processing at block 236, and then performs some RLA reading of additional blocks on the first track 230 at block 242.

The interface circuit 124 then instructs the seek 228 to occur to move the selected head 112 to the second track 234. Once servo qualification has occurred so that the second head 112 is on track and ready to read data, the interface circuit 124 causes the head 112 to immediately start reading nonrequested data sectors upon arrival, as indicated by ROA block 246 until the DATA 2 block 232 reaches the head 112.

Any number of variations of RLA and ROA can be used as desired. Although not shown in a separate drawing, it will now be readily understood that a full ROA technique could readily be used. Such a case would have a similar timing diagram to that shown in FIG. 7 except that nonrequested ROA data would be read during the latency block 240.

Returning again to FIGS. 5 and 6, the comparison of the most recently received read command of step 216 in FIG. 5 can now be understood as evaluating a probability of whether the latest read command could have been satisfied as a cache hit out of the buffer 130 had an appropriate local mode of operation been employed among the 16 read commands in the table of FIG. 6. Preferably, the data sector range blocks of FIG. 6 (such as 220) represent ranges of RLA data (that is, a range of LBAs following the last LBA associated with each read command).

Decision step 248 determines whether an overlap exists between the LBA (or LBAs) of the most recently received read command and the range blocks of the history table. If not, as represented by read command A (READ CMD A) 250 in FIG. 6, the flow passes to step 252 and the history table is updated. This preferably occurs by appending the latest read command (READ CMD A) to the table. If the table is fully populated (as shown in FIG. 6), then the oldest entry in the table is removed and an appropriate range is calculated for the new entry.

The routine of FIG. 5 continues to decision step 254 where the controller 126 next determines which mode of operation the interface circuit 124 is currently employing. If the existing mode is nonlocal, then the fact that there would not likely have been any cache hits for the past 16 commands indicates that nonlocal mode is still the appropriate mode for the current host requirements. Thus, no changes in configuration are made and the routine returns to the flow of FIG. 4 at step 256.

On the other hand, if the drive 100 is currently in local mode of operation, then a missed count value $C_M$ is updated at step 258. The missed count value tracks how many noncache hits occur in a row while the local mode of operation is employed. The updated missed count value is next compared at decision step 260 to a maximum allowable number of missed cache hits, $C_{MAX}$. This value can be set to any desired number m, such as 16 or 32.

When the number of consecutive missed counts exceeds the maximum value, then it is likely that the host data access patterns have shifted such that a nonlocal mode of operation would be more appropriate. Hence, the flow continues to step 262 where the mode is switched from local to nonlocal, and the routine returns at step 256. On the other hand, if the number of consecutive missed counts has not exceeded the maximum value, then the drive 100 remains in local mode and the routine returns at step 256.

Referring again to decision step 208 of FIG. 4, it will now be assumed that a read command B (READ CMD B) 264 of FIG. 6 represents the most recently received read command. As can be observed in FIG. 6, the read command B 264 overlaps a data range block 266 associated with read command 13.

In such case, the flow of FIG. 5 passes to step 268 wherein the history table is updated with new data associated with the read command B. However, this time the new data is not used to replace the oldest entry in the table; rather, the new data preferably replaces the overlapped data block 266.

The routine then passes to step 270 where the mode of operation is switched to local mode. Of course, if the drive 100 was already in local mode, then this was likely the right choice and the read command B request may have been able to have been satisfied by cached data from the buffer 130. The missed count $C_M$ is reset (e.g., $C_M=0$) at step 272 and the routine returns at step 256.

Any number of changes to the above embodiments can be made. For example, different types of local modes can be employed (e.g. RLA and RLA/ROA) depending on the respective alignments of the read commands and the history table. The number and orientation of the LBAs in each range block of FIG. 6 (222, 266) can be modified as desired. It will be noted that disc drives configured as described herein have been found to provide significant performance improvements using established benchmark tests.

It will now be apparent that the present invention, as embodied herein and as claimed below, is generally directed to a block data storage device and a method for transferring data between such a device and a host device. In accordance with preferred embodiments, a block data storage device (such as 100) comprises a data recording medium (such as 108) on which user data are stored in a number of data sectors having data sector addresses (such as 122). A moveable data transducing head (such as 112) is provided to access the data sectors.

An interface circuit (such as 124) processes read commands from a host device to retrieve requested user data from selected data sectors, the interface circuit dynamically switching from a nonlocal mode of operation to a local mode of operation (such as by step 262, 270) in relation to proximity of a data sector address of a most recently received read command to data sector addresses associated with previously received read commands, wherein during the local mode of operation, nonrequested user data from the recording medium are retrieved and placed into a buffer in anticipation of a future request for the nonrequested user data, and wherein during the nonlocal mode of operation said nonrequested user data are not retrieved.

Preferably, the interface circuit generates a read command history table (such as shown in FIG. 6) comprising a range of data sector addresses (such as 222, 266) associated with each of a plurality of n recently received read commands.

The interface circuit switches from the nonlocal mode to the local mode of operation (such as by step 270) when a data sector address associated with the most recently received read command falls within at least a selected one of the ranges of data sector addresses of the read command history table. The interface circuit further dynamically switches from the local mode to the nonlocal mode of operation (such as by step 262) in relation to the proximity of the data sector address of the most recently received read command to the data sector addresses of previously received read commands.

Preferably, the recordable medium comprises a recording disc on which a plurality of concentric tracks (such as 118) are defined, and wherein during the local mode the interface circuit employs a read look ahead (RLA) technique so that, during a latency period between execution of consecutive first and second read commands, the interface circuit causes the data transducing head to remain on a first track (such as 230) having a data sector (such as 228) associated with the first read command so that the nonrequested data are retrieved from at least one other data sector (such as 242) on the first track.

Further, the interface circuit preferably employs a read on arrival (ROA) technique so that, during a latency period between execution of consecutive first and second read commands, the interface circuit causes the data transducing head to move to a second track (such as 234) having a data sector associated with the second read command (such as 232) so that the nonrequested data are retrieved from at least one other data sector (such as 246) on the second track.

It will be understood that the function of the recited means for switching from a nonlocal mode of operation to a local mode of operation corresponds to the disclosed interface circuit 124 including the controller 126 programmed to carry out steps in accordance with FIGS. 4 and 5.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the data transfer routine without departing from the spirit and scope of the present invention.

In addition, although the embodiments described herein are directed to the transfer of data in a disc drive, it will be appreciated by those skilled in the art that the process can be used in other types of data storage devices without departing from the spirit and scope of the claimed invention.

What is claimed is:

1. A block data storage device comprising a host interface circuit which maintains a history of a sequence of previously received read commands with associated data sector ranges for a data storage medium, wherein the data sector range of each consecutive read command is non-sequential with respect to the data sector range of a previous read command in said sequence, and wherein the interface circuit switches from a first mode of operation, in which non-requested data are not retrieved from the medium, to a second mode of operation, in which non-requested data are retrieved from the medium, when a data sector address of a most recently received read command corresponds to at least one of said non-sequential data sector ranges.

2. The block data storage device of claim 1, wherein the interface circuit further operates to switch from the second mode of operation to the first mode of operation after a plurality of consecutively received read commands are found to not correspond to said non-sequential data sector ranges.

3. The block data storage device of claim 1, wherein the interface circuit switches from the first mode to the second mode of operation when a data sector address associated with the most recently received read command falls within one of the data sector ranges of said history.

4. The block data storage device of claim 1, wherein at least one of the previously received read commands in said history comprises a queued read command that has not yet been executed.

5. The block data storage device of claim 1, wherein the interface circuit further updates the history with the most recently received read command and removes the oldest previously received read command from said history when a data sector address of the most recently received read command is found to not correspond to at least one of said non-sequential data sector ranges.

6. The block data storage device of claim 1, wherein the interface circuit further updates the history with the most recently received read command when a data sector address of the most recently received read command is found to correspond to at least one of said non-sequential data sector ranges, wherein the most recently received read command is substituted within the history for the associated previously received read command with the corresponding non-sequential data sector range.

7. The block data storage device of claim 1, wherein the data storage medium comprises a recording disc on which a plurality of concentric tracks are defined, and wherein during the second mode the interface circuit employs a read look ahead (RLA) technique so that, during a latency period between execution of consecutive first and second read commands, the interface circuit causes the data transducing head to remain on a first track having a data sector associated with the first read command so that the nonrequested data are retrieved from at least one other data sector on the first track.

8. The block data storage device of claim 1, wherein the data storage medium comprises a recording disc on which a plurality of concentric tracks are defined, and wherein during the second mode the interface circuit employs a read on arrival (ROA) technique so that, during a latency period between execution of consecutive first and second read commands, the interface circuit causes the data transducing head to move to a second track having a data sector associated with the second read command so that the non-requested data are retrieved from at least one other data sector on the second track.

9. A block data storage, comprising:
   a recording medium configured to store user data in a number of data sectors having associated data sector addresses; and
   means for switching from a first mode of operation to a second mode of operation in relation to a detected access pattern in a sequence of data read commands issued by a host, wherein each data read command has an associated data sector address range and the data sector range of each consecutive read command is non-sequential with respect to the data sector range of a previous read command, wherein
   each said range is non-sequential with respect to the remaining ranges, wherein during the second mode of operation nonrequested user data are retrieved from the recording medium and placed into a buffer in anticipation of a future request for the nonrequested user data, and wherein during the first mode of operation said nonrequested user data are not retrieved from the recording medium and are not placed into the buffer.

10. The block data storage device of claim 9, wherein the means for switching operates to compare a selected data sector address of a most recently issued read command to data sector addresses associated with the non-sequential data read commands issued by the host.

11. The block data storage device of claim 9, wherein the means for switching further operates to switch from the second mode of operation to the first mode of operation.

12. The block data storage device of claim 9, wherein the means for switching comprises an interface circuit comprising a programmable controller.

13. A method for transferring data between a host device and a block data storage device having a first memory space and a second memory space, the second memory space storing user data in a plurality of data sectors each having an associated data sector address, the method comprising:
   providing a most recent read command to request user data from a selected data sector having a selected data sector address on a storage medium;
   comparing the selected data sector address to data sector address ranges associated with a sequence of recently received read commands, each said range being non-sequential with respect to a previous range in said sequence; and
   switching from a first mode of operation to a second mode of operation when the selected data sector address overlaps at least one of the data sector addresses associated with the sequence of read commands, wherein during the second mode of operation, nonrequested user data are retrieved from the storage medium in anticipation of a future request for the nonrequested user data, and wherein during the first mode of operation said nonrequested user data are not retrieved.

14. The method of claim 13, wherein the comparing step comprises generating a read command history table comprising a range of data sector addresses associated with each of a plurality of n recently received read commands.

15. The method of claim 14, wherein the switching step comprises switching from the first mode to the second mode of operation when a data sector address associated with the most recent read command falls within at least a selected one of the ranges of data sector addresses of the read command history table.

16. The method of claim 13, wherein the switching step further comprises switching from the second mode to the first mode of operation in relation to the proximity of the data sector address of the most recently received read command to the data sector addresses of previously received read commands.

17. The method of claim 16, wherein the comparing step comprises generating a read command history table comprising a range of data sector addresses associated with each of a plurality of n recently received read commands, and wherein the interface circuit switches from the second mode to the first-mode of operation when a plurality of m consecutive read commands are received in turn having associated data sector addresses which do not fall within at least a selected one of the ranges of data sector addresses of the read command history table.

18. The method of claim 13, wherein the block data storage device comprises a disc drive and the storage medium comprises a rigid magnetic recording disc.

* * * * *